June 28, 1938.  E. M. BURT  2,122,310
OIL AND WATER SEPARATOR
Filed April 14, 1937  3 Sheets-Sheet 1

Enos M. Burt
INVENTOR.
BY J. Preston Swecker
his ATTORNEY.

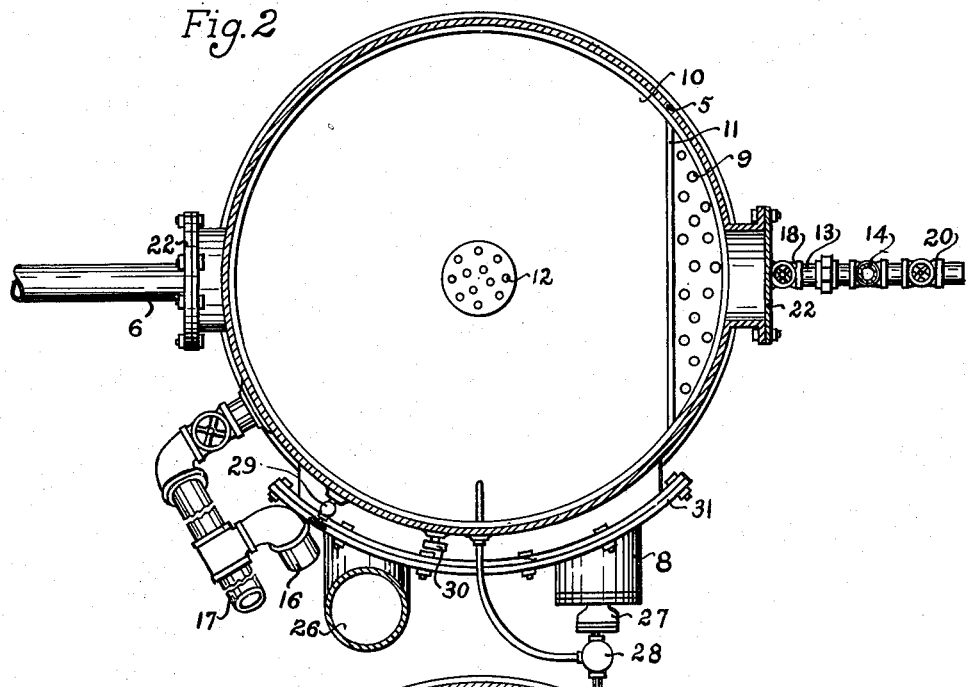
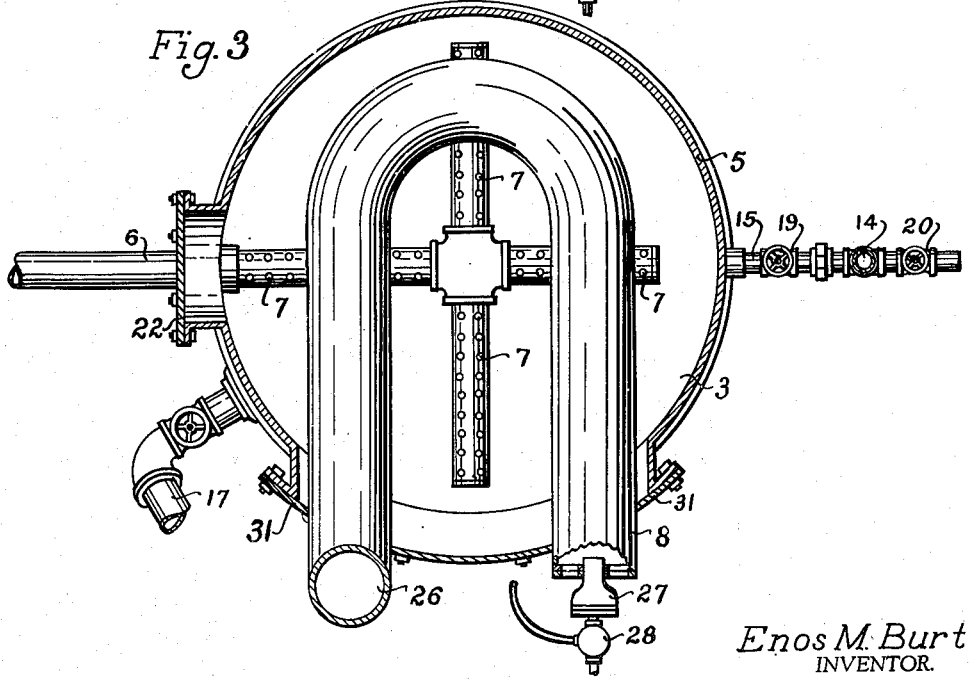

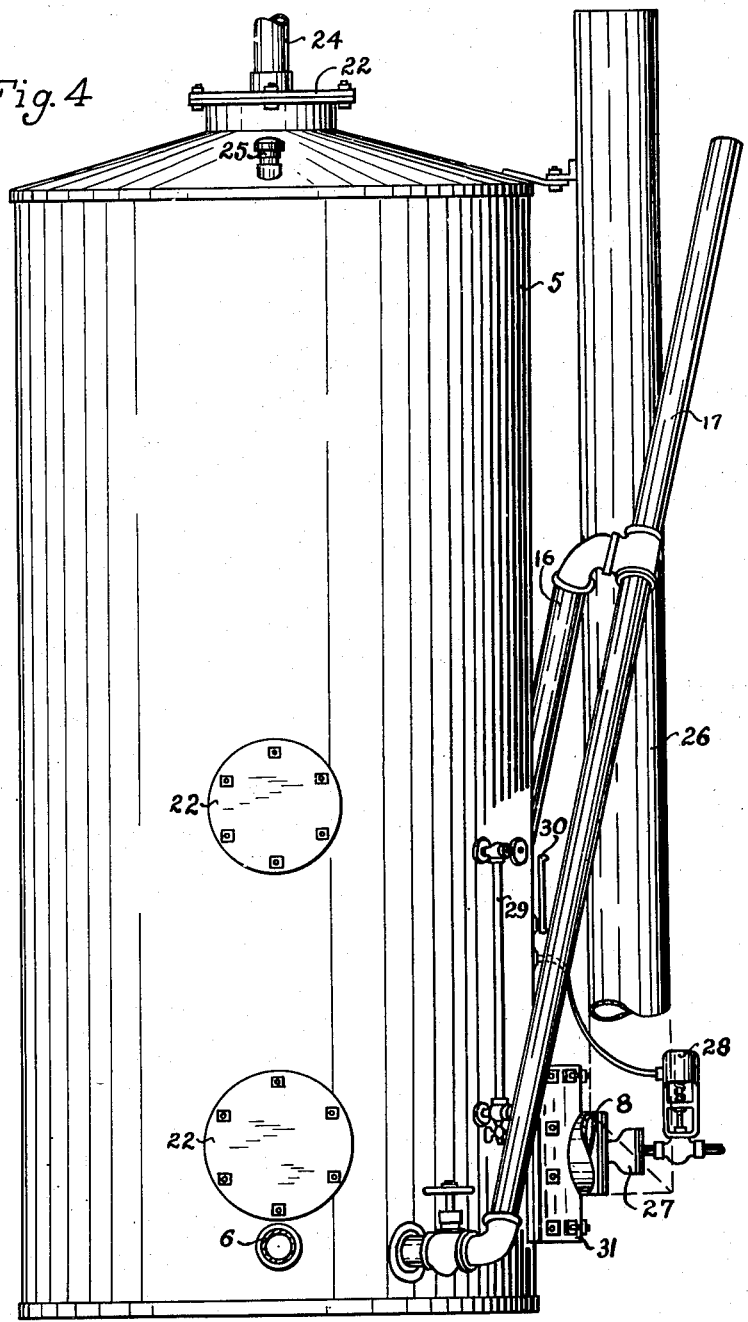

Patented June 28, 1938

2,122,310

UNITED STATES PATENT OFFICE 2,122,310

OIL AND WATER SEPARATOR

Enos M. Burt, Wichita Falls, Tex.

Application April 14, 1937, Serial No. 136,955

5 Claims. (Cl. 210—47)

This invention relates to improvements in oil and water separators.

Crude oil as produced often carries water combined in globules, and heretofore it has been very difficult to separate the water from the oil in a quick and efficient manner as the oil is passed through a settling tank.

When oil is introduced into a settling tank and through the regular system of baffles, the water that is separated out often becomes again in suspension in the oil because of the distance which the water has to settle out through the oil.

The primary object of this invention is to provide an oil and water separator that will separate the water from the oil as it passes through a series of baffles, each draining the water independently into the lower portion of the separator chamber.

Another object of this invention is to provide an oil and water separator having a series of perforated baffles and having a filtering fibrous material interposed between the baffles.

The invention, as disclosed, provides a series of baffles, a part of each baffle being perforated, and preferably in the shape of a cone. Each baffle has a pipe connected therewith to permit drawing off of the water collected at each successive step in the separation, these pipes in turn being connected with the lower portion of the separator which forms a water chamber. Due to the difference in the specific gravity of oil and water the pipes will drain the water to the lower part of this chamber and a siphon or float valve arrangement may be provided to keep the water at the desired level.

While the drawings illustrate a preferred embodiment of the invention, it is to be understood that the design may be varied and changes in the minor details of construction resorted to, to meet specific needs and requirements within the scope of the invention as claimed without departing from the spirit thereof.

In the accompanying drawings:

Fig. 2 is a horizontal section on the line 2—2 of Fig. 1, looking in the direction indicated by the arrows;

Fig. 3 is a horizontal section taken on the line 3—3 of Fig. 1, looking in the direction indicated by the arrows; and Fig. 4 is a side elevation of the invention.

Figure 1:
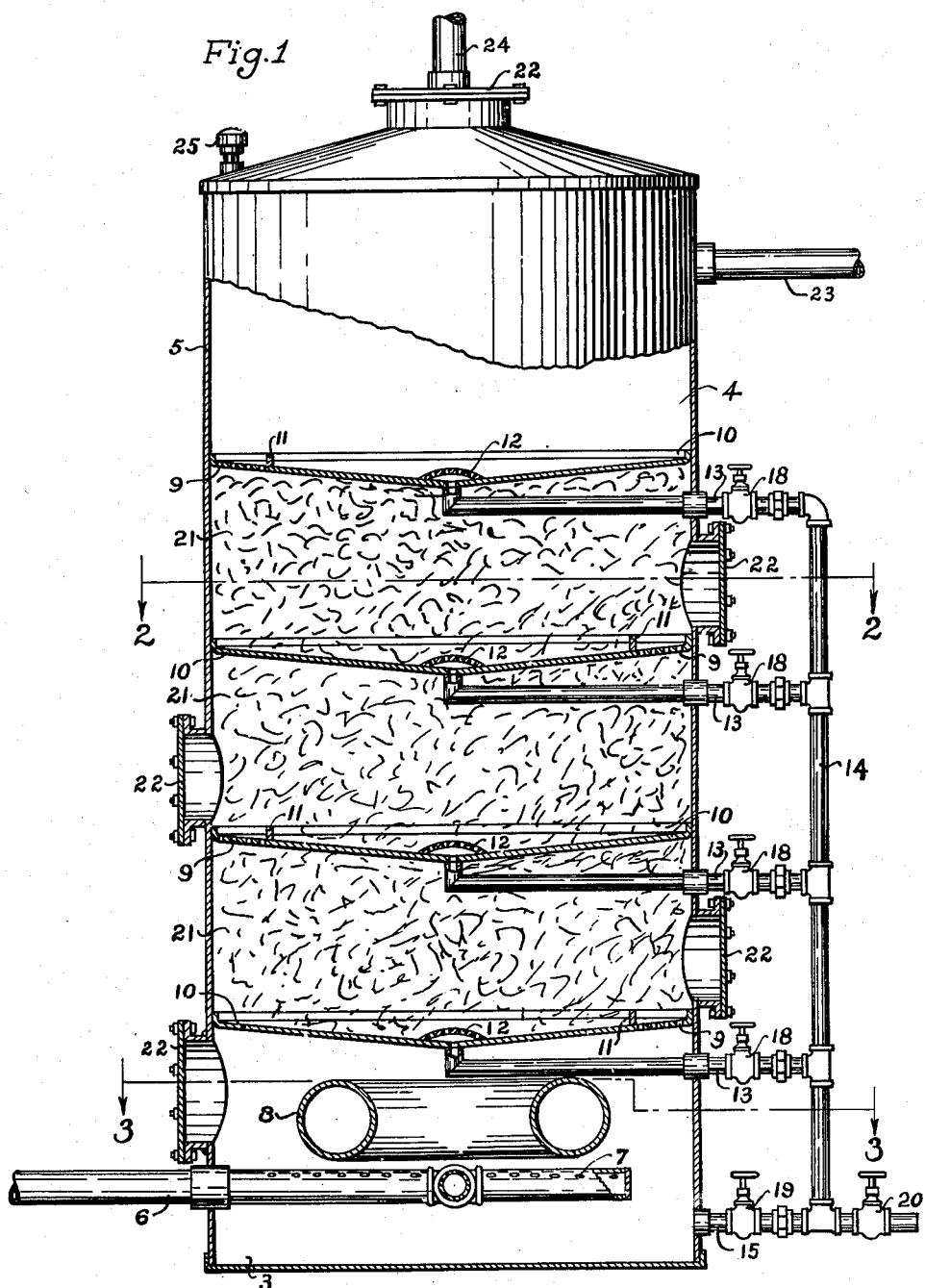
Fig. 1 is a vertical section, partly in elevation, and showing the interior construction.

With more detailed reference to the drawings, the numeral 5 designates a shell or casing of the separator. This casing has a series of transverse baffles 10 therein dividing the casing into a heating chamber 3, separating chamber 21, and an oil discharge chamber 4.

Each of the baffles 10 is of substantially inverted conical shape with an upstanding rim rigidly secured to the interior of the shell. The major portion of each baffle 10 is imperforate but at a side thereof is a perforated portion 9 having relatively minute perforations for passage of the oil emulsion therethrough with a tendency to separate the water and oil. The baffles are arranged with the perforated portions 9 alternately on opposite sides, the perforated portion of one baffle being adjacent the imperforate portions of the adjacent baffles, so that the oil emulsion passes upwardly through the separating chambers in a zigzag course. A water retaining wall 11 extends transversely of each baffle 10 from side to side thereof adjacent the perforated portion 9 to confine the separated water to the middle portion of the baffle and prevent it from escaping downwardly through the perforations.

Each of the baffles 10 has a central discharge opening with a screen or perforated plate 12 covering said opening. A pipe 13 is connected with each discharge opening and extends therefrom laterally directly through the shell or casing 5 to a point externally thereof. The pipes 13 are connected together by a manifold or connecting pipe 14 extending to a discharge pipe 15 extending from the lower portion of the inlet or heating chamber 3. Valves 18 are provided in the respective pipes 13 for controlling the discharge therethrough, making possible the selective use of any particular baffle or baffles, and also making it possible to remove the manifold 14, upon closing of the valves 18, for readily clearing the same if it should become clogged.

By having the manifold 14 located externally of the casing 5, much of the difficulty in clearing the pipe is eliminated. Valves 19 and 20 are provided in the pipe 15 on opposite sides of the point of connection of the manifold 14 therewith, the former being closed upon removal of the manifold, while the valve 20 may be opened to permit of manually draining of water and sediment from the lower part of the separator, when necessary.

An oil inlet pipe 6 extends into the heating chamber 3 in the form of a cross, having perforations 7 in the upper side thereof for admitting the crude oil emulsion under pressure into the heating chamber 3.

A U-shaped heating tube 8 is disposed in the chamber 3 directly above the inlet pipe 6. The opposite ends of said heating tube 8 are attached to a plate 31 removably secured to a side of the casing 5, so that the heater is removable with said plate for repairs or replacement without dismantling the separator and without the necessity of taking it to a repair shop. A burner 27 is arranged in one end of the tube 8 while a vent pipe 26 is connected with the opposite end. The burner 27 may be operated either by gas or oil and preferably is controlled by a thermostatically regulated valve 28.

As the crude oil emulsion is introduced into the heating chamber 3 and is heated therein by the heating tube 8, it becomes thin facilitating the breaking up of the globules and the separation of the oil and water. Due to the difference in specific gravities, the water has a tendency to settle to the bottom and the oil flow to the top. Some of the water will settle out in the heating chamber 3 and the remaining water and oil emulsion will be forced upwardly in a zigzag course through the perforated portions 9 in the baffles 10 and through the series of settling chambers 21 in each of which additional water will settle out and be drawn off through the pipes 13, until substantially pure oil will flow through the oil chamber 4 at the top of the separator from which it may be drawn off through a pipe 23 leading to other settling or storage tanks of a pipe line or other point of storage or use.

The separating chambers 21 preferably are filled with a wood fiber material, such as excelsior or hay or the like which acts as a filter and facilitates the separation of the oil and water.

Manholes 22 are provided in the respective compartments for gaining access thereto for clearing and for removal and replacement of the filtering material after extended use thereof when it becomes contaminated. A gas outlet 25 may be provided in the top of the chamber 4 to permit the escape of gas, and a safety valve 25 may be provided also to prevent excess pressure from forming in the separator.

A thermometer 30 enables the operator to determine the best operating temperature for the separator, while a glass gauge 29 is provided on the separator to indicate the water level therein. The usual syphon pipes 16—17 may be provided at a side of the shell as shown in Fig. 4 to draw off the water from the separator, but any other suitable water discharge may be provided as desired such as a float valve.

The syphon pipes 16—17 may be swung up or down as usual to regulate the water level in the casing 5. Normally, this water level may be above the lowermost baffle 10, when heat is being applied, but it may be lowered to a point within the chamber 3 for some oils when artificial heat is not required.

I claim:

1. In an oil and water separator, the combination of a casing having a plurality of baffles therein, said baffles being spaced apart vertically and each having a depressed portion and perforated and imperforate portions arranged alternately with the perforated portion of one baffle adjacent the imperforate portion of the next adjacent baffle, said baffles having the peripheries therein secured to the casing in such manner as to prevent flow around the baffles between the same and the casing and to cause flow through the perforated portions, said casing having a water chamber below said baffles, a water discharge conduit leading from the depressed portion of each baffle directly laterally to a point externally of the casing and connected with the water chamber for directing the separated water thereto, means for introducing oil emulsion into the water chamber for upflow through the baffles, means for controlling the discharge of water from said water chamber, and means for draining off the separated oil from the upper portion of the casing above the baffles.

2. In an oil and water separator, the combination of a casing having a plurality of inverted conical baffles therein, said baffles being spaced apart vertically and each having perforated and imperforate portions arranged alternately with the perforated portion of one baffle adjacent the imperforate portion of the next adjacent baffle, a water discharge conduit leading from the lower portion of each baffle directly laterally to a point externally of the casing, said casing having an emulsion chamber in the lower portion thereof below the baffles for receiving oil emulsion, heating means in said chamber, a water discharge conduit connected with said chamber and with the conduits leading from the baffles, a water discharge syphon connected with the emulsion chamber, and means for draining off the oil from the upper portion of the casing above the baffles.

3. In an oil and water separator, the combination of a casing having an oil inlet at the lower portion thereof and an oil outlet at the upper portion thereof, said casing having a plurality of transverse baffles therein dividing the same into chambers one above another, each baffle having a depressed central portion, a conduit for draining off water from said central portion, each of said chambers having an inlet through a baffle at the one side and an outlet to an adjacent chamber at another side, and an upstanding wall in each of said chambers adjacent the inlet and between said inlet and the water outlet at the center.

4. An oil and water separator comprising a casing having a plurality of transverse baffles arranged therein dividing said casing into superposed chambers, said casing having a water chamber below said baffles and adapted to receive oil emulsion, each of said baffles having a central depression, means for passage of oil emulsion upwardly from the water chamber through the superposed chambers in a tortuous path permitting settling of water into the central depressions of the baffles, a conduit connected with the central depression of each baffle and extending laterally to a point externally of the chamber, a manifold pipe connected with said conduits and with the water chamber for draining the water from the central depressions into the water chamber, and automatic means for discharging the water from the water chamber to maintain a liquid level in the casing.

5. In an oil and water separator, the combination of a casing having a plurality of baffles arranged horizontally therein, said baffles being spaced apart vertically and each having perforated and imperforate portions arranged alternately with the perforated portion of one baffle adjacent the imperforate portion of the next adjacent baffle, said baffles having the entire peripheries thereof secured to the casing in such manner as to prevent flow around the baffles between the same and the casing and to cause flow through the perforated portions, a pervious contact material substantially filling the upper portion of the space between separated baffles, said casing having a water chamber below said baffles, means for introducing oil emulsion into the lower portion of the casing for upflow through the baffles permitting settling out of the water from the oil emulsion over each baffle, a discharge conduit for the separated water leading from a portion of each baffle spaced inwardly from the casing directly laterally to a point externally of the casing and connected with the water chamber for directing the separated water thereto, and means for draining off the separated oil from the upper portion of the casing above the baffles.

ENOS M. BURT.